US010551190B1

(12) United States Patent
Shcheglov et al.

(10) Patent No.: US 10,551,190 B1
(45) Date of Patent: Feb. 4, 2020

(54) MULTI CORIOLIS STRUCTURED GYROSCOPE

(71) Applicant: Garmin International, Inc., Olathe, KS (US)

(72) Inventors: Kirill V. Shcheglov, Duarte, CA (US); David Smukowski, Seattle, WA (US); Yingxiang Cheng, Goleta, CA (US); Nolan F. Maggipinto, Santa Barbara, CA (US)

(73) Assignee: Garmin International, Inc., Olathe, KS (US)

( * ) Notice: Subject to any disclaimer, the term of this patent is extended or adjusted under 35 U.S.C. 154(b) by 263 days.

(21) Appl. No.: 15/337,627

(22) Filed: Oct. 28, 2016

Related U.S. Application Data

(60) Provisional application No. 62/248,983, filed on Oct. 30, 2015.

(51) Int. Cl.
*G01C 19/5684* (2012.01)

(52) U.S. Cl.
CPC ................. *G01C 19/5684* (2013.01)

(58) Field of Classification Search
CPC ...... G01C 19/57; G01C 19/56; G01C 19/722; G01C 19/66; G02C 19/58; H03H 2003/027; H03H 9/205
USPC ...................................... 73/504.12
See application file for complete search history.

(56) References Cited

U.S. PATENT DOCUMENTS 4,120,588 A * 10/1978 Chaum ............... G01C 19/722
356/460

5,097,707 A * 3/1992 Church ............. G01C 19/5698
73/504.01
6,079,272 A    6/2000 Stell
6,097,486 A * 8/2000 Vakoc ................ G01D 5/35383
356/477
6,208,590 B1 * 3/2001 Kim .................... G01D 5/35383
356/483

(Continued)

FOREIGN PATENT DOCUMENTS

WO    WO 2005/100237    10/2005

OTHER PUBLICATIONS

U.S. Appl. No. 15/337,436, filed Oct. 28, 2016, Shcheglov.

(Continued)

*Primary Examiner* — Lisa M Caputo
*Assistant Examiner* — Tran M. Tran
(74) *Attorney, Agent, or Firm* — Samuel M. Korte; Max M. Ali (57) ABSTRACT

A resonator paradigm, where the resonator structure is made up of a very large number of small, coupled Coriolis sensitive units arranged in a periodic 1D or 2D (and, possibly, in the future, 3D) structure to create a Coriolis-sensitive "fabric" that supports a large number of Coriolis-coupled "supermodes. Such a "fabric" can be shaped into arbitrary "waveguides" that propagate either pulses of excitation that are Coriolis-coupled, thus enabling an acoustic version of a FOG-type gyroscope (where a pulse of excitation travels along a passive waveguide and it's phase/time delay is measured), or support multiple "stationary" Coriolis-coupled vibration modes analogous to optical laser modes in an RLG where counter-propagating modes of oscillation are maintained at constant amplitude via a continuous addition of energy.

19 Claims, 5 Drawing Sheets

(56) References Cited

U.S. PATENT DOCUMENTS

| | | | |
|---|---|---|---|
| 6,360,601 B1 | 3/2002 | Challoner | |
| 6,367,786 B1 | 4/2002 | Gutierrez | |
| 6,467,346 B1 | 10/2002 | Challoner | |
| 6,584,845 B1 | 7/2003 | Gutierrez | |
| 6,598,455 B1 | 7/2003 | Raevis | |
| 6,675,630 B2 | 1/2004 | Challoner | |
| 6,677,696 B1 * | 1/2004 | Ruile | H03H 9/02559 310/313 A |
| 6,774,645 B1 * | 8/2004 | Leidl | G01N 33/2858 324/658 |
| 6,796,179 B2 | 9/2004 | Bae | |
| 6,823,734 B1 | 11/2004 | Hayworth | |
| 6,882,964 B2 | 4/2005 | Bayard | |
| 6,915,215 B2 | 7/2005 | M'Closkey | |
| 6,944,931 B2 | 9/2005 | Shcheglov | |
| 6,955,084 B2 | 10/2005 | Challoner | |
| 6,984,332 B2 * | 1/2006 | Varadan | G01C 19/5698 216/2 |
| 6,990,863 B2 | 1/2006 | Challoner | |
| 7,017,410 B2 | 3/2006 | Challoner | |
| 7,040,163 B2 | 5/2006 | Shcheglov | |
| 7,159,441 B2 | 1/2007 | Challoner | |
| 7,168,318 B2 | 1/2007 | Challoner | |
| 7,227,432 B2 * | 6/2007 | Lutz | H03H 3/0076 310/309 |
| 7,285,844 B2 | 10/2007 | Hayworth | |
| 7,403,084 B2 * | 7/2008 | Lutz | H03H 9/02259 310/309 |
| 7,437,253 B2 | 10/2008 | Shcheglov | |
| 7,545,014 B2 * | 6/2009 | Wang | H01Q 3/443 257/443 |
| 7,595,708 B2 * | 9/2009 | Lutz | H03H 3/0076 310/309 |
| 7,619,495 B2 * | 11/2009 | Albacete | H01P 1/20381 333/118 |
| 7,675,217 B2 * | 3/2010 | Delevoye | H03H 9/02338 310/309 |
| 7,818,871 B2 | 10/2010 | Shcheglov | |
| 7,900,512 B2 * | 3/2011 | Kano | G01C 19/5698 73/504.01 |
| 7,911,296 B2 * | 3/2011 | Nguyen | H03B 5/30 333/186 |
| 8,068,232 B2 * | 11/2011 | Terrel | G01C 19/727 356/461 |
| 8,393,214 B2 * | 3/2013 | Ruile | G01C 19/5698 73/514.12 |
| 8,432,551 B2 * | 4/2013 | Salit | G01C 19/66 356/469 |
| 8,958,074 B1 * | 2/2015 | Xu | G01C 19/722 356/465 |
| 10,024,656 B2 * | 7/2018 | Lodden | G01C 19/5621 |
| 2009/0217774 A1 * | 9/2009 | Sills | G01D 5/2086 73/862.193 |
| 2017/0074656 A1 * | 3/2017 | Tallur | G01C 19/5698 |
| 2019/0145817 A1 * | 5/2019 | Shim | G01H 11/06 |

OTHER PUBLICATIONS

U.S. Appl. No. 15/337,480, filed Oct. 28, 2016, Shcheglov.
U.S. Appl. No. 15/337,572, filed Oct. 28, 2016, Shcheglov.
U.S. Appl. No. 15/337,681, filed Oct. 28, 2016, Shcheglov.

* cited by examiner

MULTI CORIOLIS STRUCTURED GYROSCOPE

PRIORITY CLAIM

The present application claims priority to U.S. Provisional Patent Application Ser. No. 62/248,983, filed Oct. 30, 2015, entitled "Multi Coriolis Structured Gyroscope," the entirety of which is hereby incorporated by reference.

BACKGROUND

1. Field

The present disclosure relates generally to resonating structures. More particularly, the present disclosure relates to Coriolis coupled gyroscope devices.

2. Related Art

Current State-of-the-art micro-electro-mechanical sensors (MEMS) gyroscope technology utilizes either well-defined mass-on the spring type resonators (Foucault pendulum, tuning fork gyroscope (TFG), quad-mass gyroscope (QMG)), or structures supporting a pair of Coriolis coupled modes where the mass and the spring are distributed throughout the resonator structure (hemispherical resonating gyroscope (HRG), annular ring, disc resonating gyroscope (DRG)). These devices suffer from limitations in limited utilization of the available device footprint, low signal to noise ratio and fabrication imperfections causing noise.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention are directed to a resonator structure that is made up of a very large number of small, coupled Coriolis sensitive units arranged in a periodic one dimensional (1D) or two dimensional (2D) (and, possibly, in the future, three dimensional (3D)) structure, thus creating a Coriolis-sensitive fabric that supports a large number of Coriolis-coupled supermodes. Such a fabric can be shaped into arbitrary waveguides that propagate pulses of excitation (signals) that are Coriolis-coupled, thus enabling an acoustic version of a fiber optic gyroscope (FOG)-type gyroscope (where a pulse of excitation travels along a passive waveguide and its phase delay and/or time delay is measured).

Embodiments of the invention also relate to a resonator structure that supports multiple stationary Coriolis-coupled vibration modes analogous to optical laser modes in a ring laser gyroscope (RLG) where counter-propagating modes of oscillation are maintained at constant amplitude via a continuous addition of energy.

According to one aspect of the invention, a gyroscope is disclosed that includes a resonator comprising a Coriolis-sensitive fabric, the Coriolis-sensitive fabric comprising a plurality of coupled Coriolis-sensitive units arranged in a periodic structure.

According to another aspect of the invention, a gyroscope is disclosed that includes a resonator body comprising a Coriolis-sensitive fabric, the Coriolis-sensitive fabric comprising a plurality of coupled Coriolis-sensitive units arranged in a periodic structure, wherein the plurality of coupled Coriolis-sensitive units are shaped into waveguides and support a large number of Coriolis-coupled supermodes.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

In the following description of embodiments of the invention, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

MEMS gyroscopes use the coriolis effect to measure the angular rate of movement (the rotational movement) of the gyroscope. Gyroscopes typically determine the rotational movement using an internally moving proof mass. A typical electromechanical gyroscope comprises a suspended proof mass, gyroscope case, pickoffs, torquers and readout electronics. The proof mass—a resonator—is suspended from a base plate that attached to the resonator at a stiff central attachment area. The proof mass vibrates when the gyroscope is moved; sensors in the gyroscope can measure the vibration of the separate masses, and the angular rate of movement can be extracted from the measured data.

Embodiments of the invention relate to resonators where the resonator structure is made up of a very large number of small, coupled Coriolis sensitive units arranged in a periodic 1D or 2D (and, possibly, in the future, 3D) structure, thus creating a Coriolis-sensitive fabric that supports a large number of Coriolis-coupled supermodes. Exemplary structures of this type are shown in FIGS. 1A-1F and will be described in further detail hereinafter.

Such a fabric can be shaped into arbitrary waveguides that propagate either pulses of excitation that are Coriolis-coupled, thus enabling an acoustic version of a FOG-type gyroscope (where a pulse of excitation travels along a passive waveguide and its phase delay and/or time delay is measured), or support multiple stationary Coriolis-coupled vibration modes analogous to optical laser modes in an RLG (where counter-propagating modes of oscillation are maintained at constant amplitude via a continuous addition of energy).

Existing electrostatic excitation, tuning, and sensing technology enable an acoustic equivalent of such devices as a positive gain section (akin to a laser gain medium) via the use of parametric excitation, waveguides, beam splitters, directional couplers, distributed feedback structures, diffraction gratings, etc. Techniques such as mode locking, both active and passive, can be utilized to precisely control the excitation patterns. In addition, electrostatic spring softening can be utilized to control the effective refractive index of the fabric in both a static and a dynamic manner, thus enabling precise control and manipulation of the excitation pattern.

In embodiments of the present invention, shaping the array of sensor units into arbitrary waveguides that propagate pulses of excitation that are Coriolis-coupled has a variety of advantages over conventional gyroscopes. For example, the benefits of utilizing embodiments of the present invention are:
1. efficient utilization of the available device footprint;
2. the ability to support large vibration amplitudes thus increasing the Coriolis force and the sensor signal to noise ratio (SNR);
3. the ability to apply advanced excitation control and signal processing techniques developed in the optical realm;
4. the tendency to average out local fabrication imperfections by utilizing large ensembles of Coriolis-sensitive units; and
5. the ability to have multiple virtual gyroscopes operating on the same physical fabric but separated in frequency, thus creating a possibility of utilizing the bias correlations from different gyroscoping modes to detect and cancel out bias drift while obviating the need for a large number of separate hardware signal channels.

Embodiments of the invention are a first step in the direction of evolving Coriolis sensitive resonator structures into smart active materials with Coriolis-sensing properties. Advantages of such smart active materials include efficient sensor miniaturization, environmental robustness, high shock survivability, and ease of integration into complex navigation systems.

Conventional MEMS gyroscopes utilize the Coriolis force to measure rotation, which for a moving point mass is given by the well-known equation:

$$F_c = 2m\vec{v} \times \vec{\Omega}$$

For a vibratory type sensor, where the motion is periodic, the velocity is proportional to the product of amplitude and frequency:

$$v \propto a\omega$$

Thus, the relevant figure of merit for a Coriolis-sensing structure becomes:

$$m a \omega$$

To increase the Coriolis signal (and thus the performance of the sensor), either the moving mass, the frequency, or the motion amplitude are increase. Other design considerations affect the choice of the vibration frequency, such as electronics noise spectrum, vibration and shock considerations, and materials properties. For instance, to be robust to a 20000 g shock, the structure has to have a translational resonance frequency above 3050 kHz, depending on the available structure clearance. These and other considerations suggest that frequencies between 100 and 500 kHz will probably be in the optimal design range. Conventional homogeneous materials support Coriolis-coupled bulk mode pairs (for example, the transverse acoustic branches are Coriolis-coupled), but due to the limitations of achievable strain in the bulk, the product $a\omega$ remains nearly constant and small over the whole range of utilizable frequencies (up to 100s of MHz). At higher frequencies other loss mechanisms (such as Akhiezer damping) quickly begin to dominate greatly increasing the damping and thus the intrinsic noise of the system. In addition, because of the high elastic modulus of common materials (in the 100 GPa range), the wavelengths at lower frequencies are quite long, thus precluding the use of compact structures. With the realistic material densities ranging over not more than on order of magnitude (2.5 gm/cm$^3$ for Si on the light side up to 22.6 gm/cm$^3$ for Iridium, the densest material presently known), the prospect for increasing the figure of merit by increasing the mass factor m in the $m a \omega$ is limited. Accordingly, what is needed is a structure that greatly decreases the material stiffness thus lowering the effective wavelength and proportionately increasing the available motion amplitude, while maintaining a material density similar to the bulk, to achieve the multiple orders of magnitude increase in signal required to meet advanced navigation system requirements.

To achieve the required decrease in the material stiffness, embodiments of the invention are directed to an engineered material consisting of a periodic array of unit cells that maintains the density fairly close to the bulk (above 50%) while reducing the effective (long range, over multiple unit cells) stiffness by many orders of magnitude. In this manner, the effective elastic modulus for lower frequency modes (where the wavelength is much greater than the unit cell spacing) can be tuned to almost arbitrarily low values thus lowering the effective acoustic propagation velocity:

$$c = \sqrt{\frac{K}{\rho}}$$

where K is the effective modulus, and $\rho$ is the density.

The resulting wavelengths in the optimal range can thus be made fairly short, enabling the use of compact structures and proportionally increasing the Coriolis interaction time of the vibration pattern traveling over a fixed distance (such as in multiple loops of a vibration guiding structure, an acoustic analogue to a FOG gyroscope).

Coriolis-Sensitive Unit Cell

A Coriolis-sensitive atom of the fabric of embodiments of the invention is essentially a very simple mass-on-the spring. The challenge is to design the geometry in such a way as to most efficiently utilize the available physical sensor area. For the nominal size profile of 1 cm$^3$ this translates into roughly a 5×5 mm available silicon footprint (allowing room for vacuum packaging, mechanical support and electronics integration). Given a fabrication process profile (primarily, the achievable DRIE trench aspect ratio), and recognizing that the more units are packed into the active structure, the more the system approaches the desired Coriolis-sensitive "continuum" behavior, an optimal unit size can be determined. Since the trench is essentially wasted space (albeit necessary to provide the needed fabric function), the optimal cell size lies at about 50-70% of solid areal fill factor. Thus, the cell size is about 3×-4× the minimum trench width for the simplest cell designs.

Figure 1A:
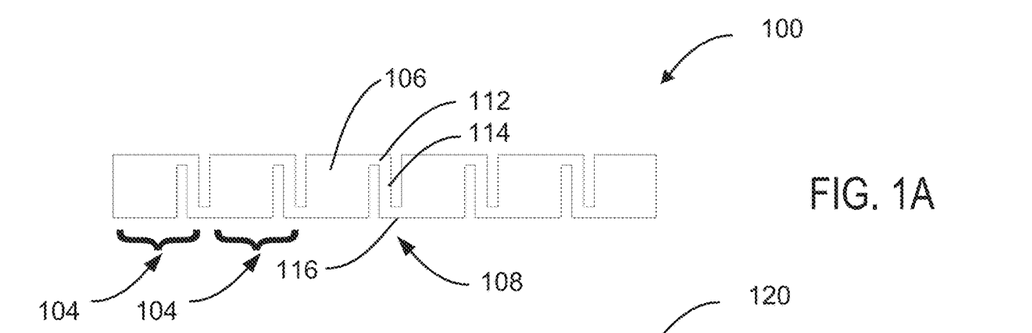
FIG. 1A is a schematic view of a periodic 1-dimensional Coriolis-sensitive structure in accordance with one embodiment of the invention.

An exemplary cell design is shown in FIG. 1A. In FIG. 1A, the cell design 100 is a periodic one-dimensional structure. The cell design 100 includes a plurality of cell components 104 that repeat. Each cell component 104 includes a square section 106 and a connector element 108. The connector element 108 includes a horizontal bar 112, a vertical bar 114 and another horizontal bar 116.

Figures 1B, 1C:
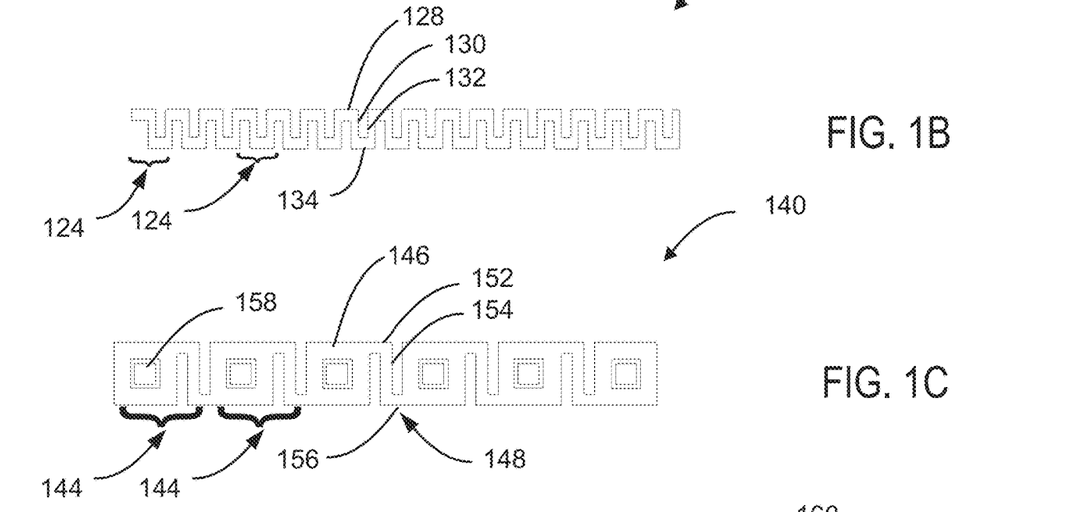
FIG. 1B is a schematic view of a periodic 1-dimensional Coriolis-sensitive structure in accordance with one embodiment of the invention.
FIG. 1C is a schematic view of a periodic 1-dimensional Coriolis-sensitive structure in accordance with one embodiment of the invention.

Another exemplary cell design is shown in FIG. 1B. In FIG. 1B, the cell design 120 is also a periodic one-dimensional structure that is a corrugated ribbon type. The cell design 120 also includes plurality of cell components 124 that repeat. Each cell component 124 includes a horizontal bar 128, a first vertical bar 130, another horizontal bar 132, and a second vertical bar 134.

A slightly more complex cell design with a bias electrode enabling the control of the excitation frequency (and thus propagation parameters) is shown in FIG. 1C. The design shown in FIG. 1C requires a size increase of another 2× trench widths. The cell design 140 includes a plurality of cell components 144 that repeat. Each cell component 144 includes a square section 146 and a connector element 148. The connector element 148 includes a horizontal bar 152, a vertical bar 154 and another horizontal bar 156. Each cell component 144 further includes an electrode element 158.

Figure 1D:
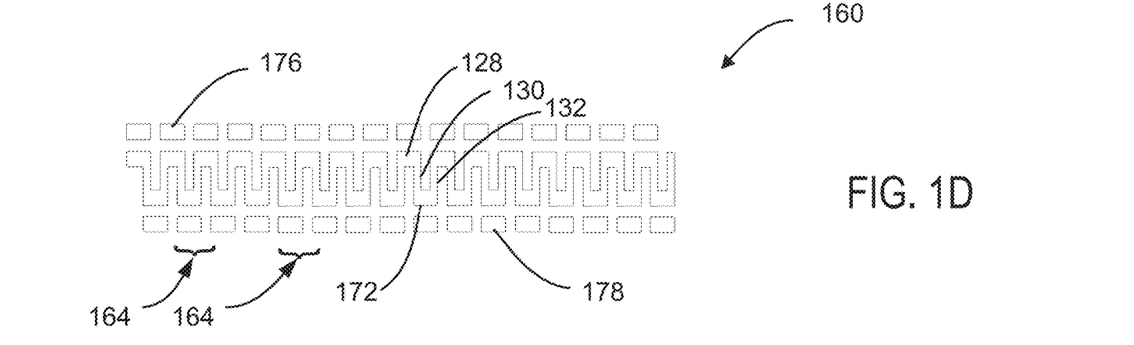
FIG. 1D is a schematic view of a periodic 1-dimensional Coriolis-sensitive structure in accordance with one embodiment of the invention.

FIG. 1D shows an alternate complex cell design with a bias electrode. The cell design 160 also includes plurality of cell components 164 that repeat. Each cell component 164 includes a horizontal bar 168, a first vertical bar 170, another horizontal bar 172, and a second vertical bar 174. Each cell component 164 further includes first and second electrode elements 176, 178.

Figure 1E:
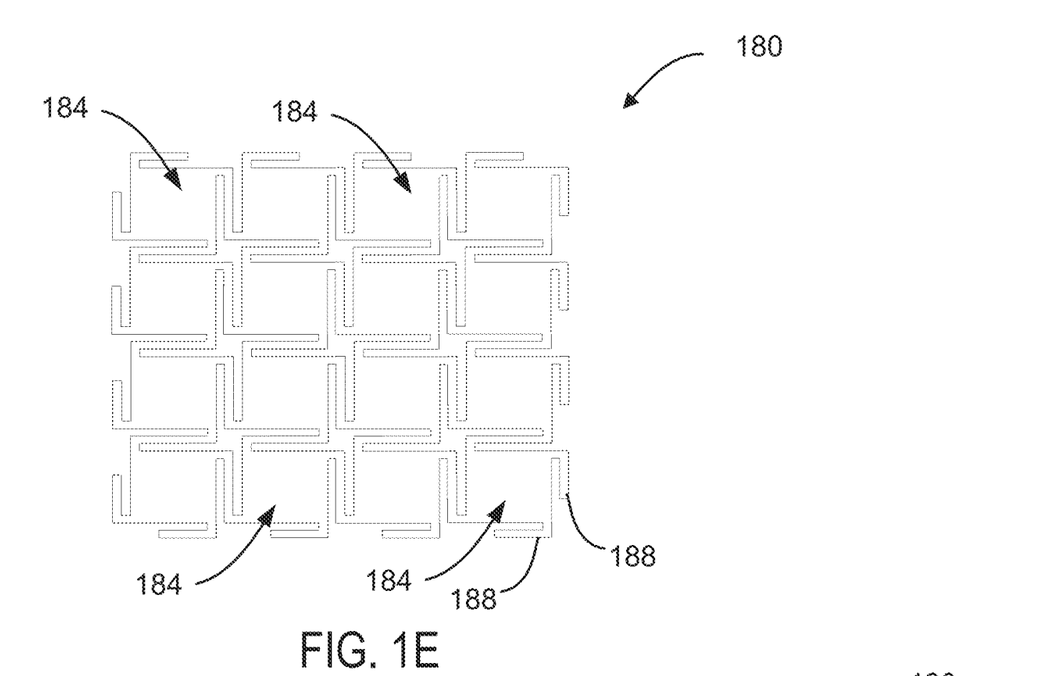
FIG. 1E is a schematic view of a periodic 2-dimensional Coriolis-sensitive structure in accordance with one embodiment of the invention.

FIG. 1E shows a two-dimensional example of a periodic structure according to one embodiment of the invention. The structure includes a plurality of cell components 180 that repeat. Each cell component 180 includes a square section 184 and connector elements 188.

Figure 1F:
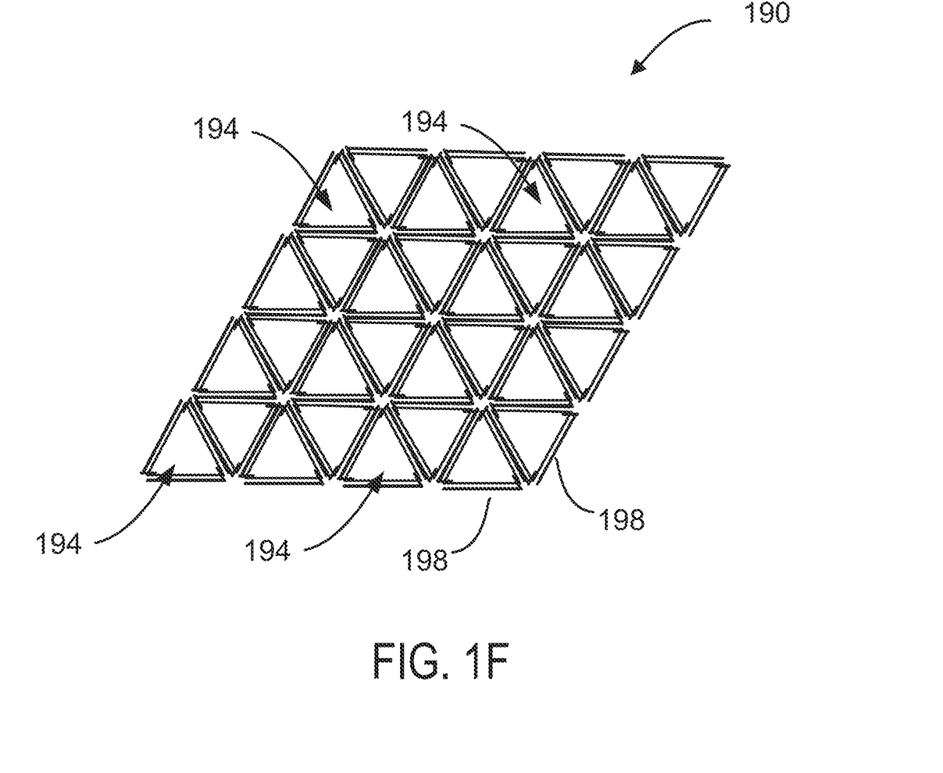
FIG. 1F is a schematic view of a periodic 2-dimensional Coriolis-sensitive structure in accordance with one embodiment of the invention.

FIG. 1F shows an alternative two-dimensional example of a periodic structure. The structure includes a plurality of cell components 190 that repeat. Each cell component 190 includes a triangle section 194 and connector elements 198.

For a number of widely available DRIE processing tools, the trench width can be reliably set at 1 μm, thus allowing a cell size in the 3-6 μm range. For a nominal die footprint, the die will have an array of about 1,000×1,000 unit cells, enabling a fairly large number of supermodes that have over 30-50 units cells/wavelength thus operating in a quasi-continuum regime. It will be appreciated that the number of unit cells in the array may be less than 1,000 or more than 1,000.

Sensor Designs

Figure 2A:
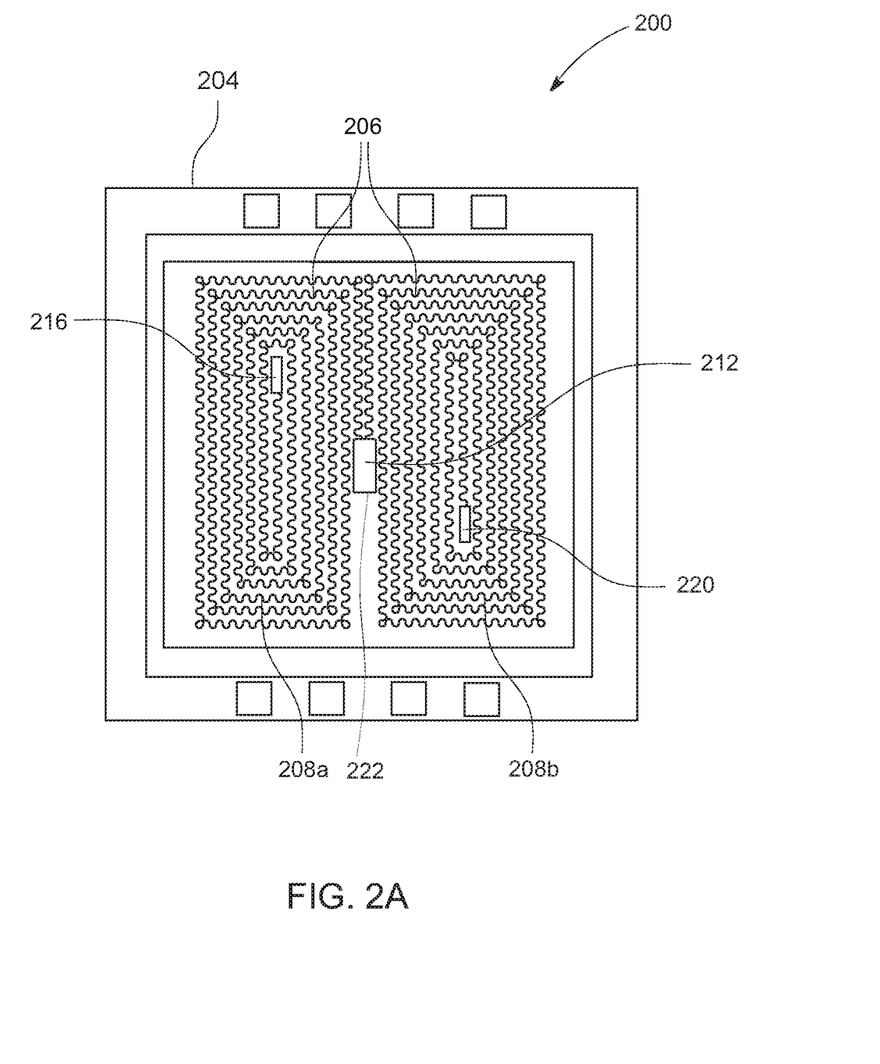
FIG. 2A is a schematic diagram of a sensor die ballistic pulse (FOG-type) in accordance with one embodiment of the invention.

FIG. 2A shows an exemplary ballistic type gyroscope sensor. The sensor 200 includes a resonator body 204 that includes a one-dimensional, Coriolis-sensitive waveguide fabric 206 formed of a first waveguide 208a and a second waveguide 208b, each of which may be formed of a periodic structure depicted in FIGS. 1A-1D and arranged as a continuous string. The sensor 200 further includes a travel path formed by the first waveguide 208a and the second waveguide 208b form two counter-propagating loops traveling between a signal generation unit 222, which outputs signals (excitation pulses) and is located at a excitation pulse launch point 212, and two measurement locations 216, 220, respectively, from which a phase and/or a time delay may be determined by control electronics.

The one-dimensional, Coriolis-sensitive fabric 206 is utilized (in this example illustrated in FIG. 2A as a corrugated ribbon type) to propagate a signal (an excitation pulse) from the signal generation unit 222 located at the excitation pulse launch point 212 over a large number of turns in the first waveguide 208a and the second waveguide 208b to the measurement locations 216, 220. This increases the sensor baseline to effectively about a 1 meter long in a chip of about a 5 mm×5 mm footprint. The first waveguide 208a and the second waveguide 208b, which are counter-propagating loops, are utilized to provide anti-correlated phase and/or time delayed signals that are measured at the two measurement locations 216, 220, thus cancelling the correlated (common mode) bias drift.

Figure 2B:
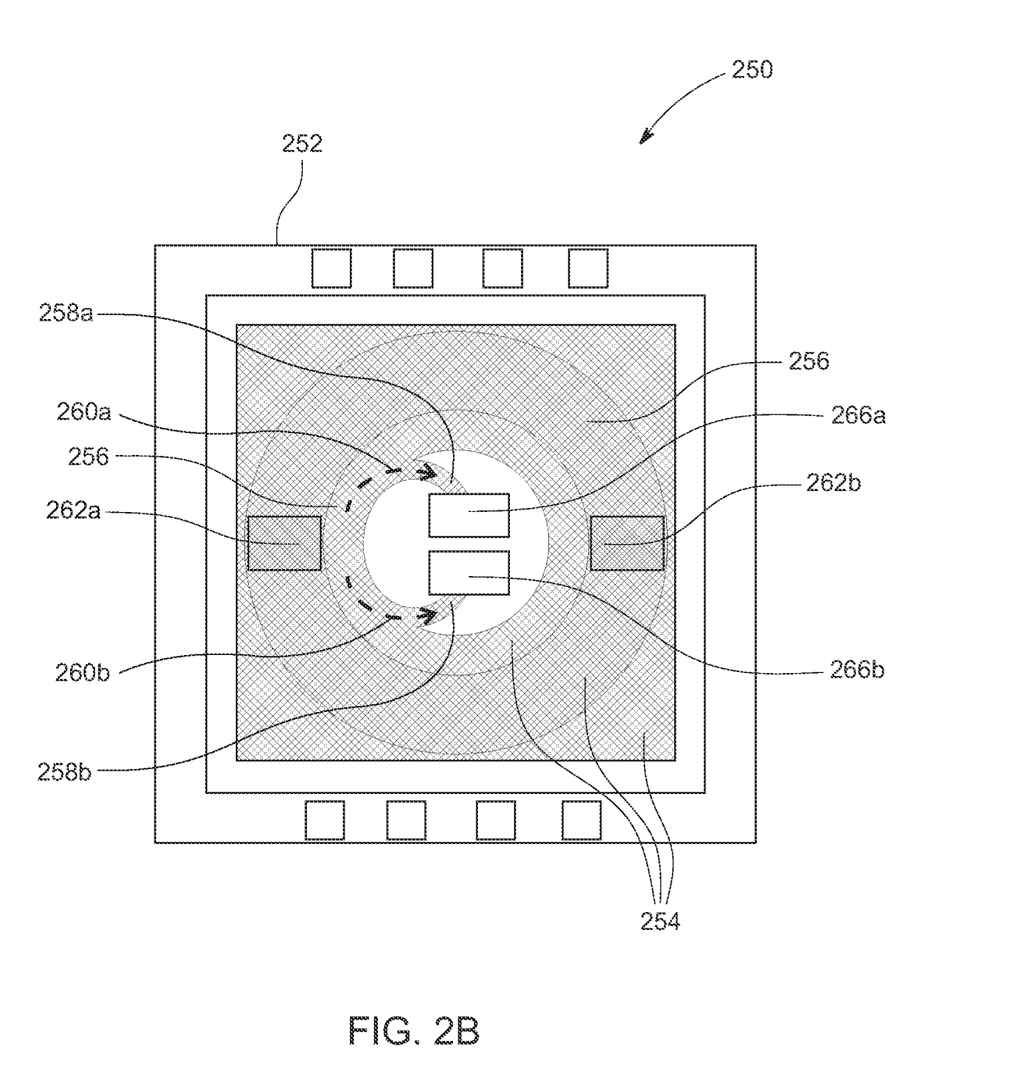
FIG. 2B is a schematic diagram of a counter-propagating mode (RLG-type) in accordance with one embodiment of the invention.

FIG. 2B shows an alternative exemplary gyroscope sensor. The sensor 250 includes a resonator body 252 having an active two-dimensional (2D), Coriolis-sensitive waveguide fabric 254, which may be formed of the periodic structure depicted in FIGS. 1E-1F. The active 2D waveguide fabric 254 supports multiple counter-propagating Coriolis-sensitive modes in the manner of an RLG. The waveguide fabric 254 of sensor 250 further includes a guiding higher index area 256, which may be an area of lower stiffness than the remainder of the waveguide fabric 254. The waveguide fabric 254 of sensor 250 also includes counter-propagating first and second mode loops 258a, 258b (forming a first travel path 260a and a second travel path 260b, respectively, along which signals travel), first and second amplifying gain regions 262a, 262b and first and second vibration pick-offs 266a, 266b. Counter-propagating modes of oscillation are maintained at constant amplitude via a continuous addition of energy provided by the first and second amplifying gain regions 262a, 262b.

The waveguide fabric 254 is physically attached to other portions of the resonator body 252 in a manner that isolates the active waveguide fabric 254 portion from the outside (external) vibration and stress. The waveguide fabric 254 structure can be active (utilizing tuning electrodes to localize the excitation travel path) and/or passive (utilizing a stiffness grading to accomplish the same).

A section of the waveguide fabric 254 contains a plurality of tuning electrodes and first and second amplifying gain regions 262a, 262b used for parametric excitation thus providing signal gain and enabling oscillation to persist in the waveguide fabric 254 and the counter-propagating first and second mode loops 258a, 258b. Strategically placed pick-off points 266a, 266b are used to sample the excitation and measure the relative phase and/or time delay of the counter-propagating mode pairs thus providing multiple collocated virtual gyroscopes.

Electrostatic spring softening can be utilized to control the effective refractive index of the waveguide fabric 254 in both a static and a dynamic manner, thus enabling precise control and manipulation of the excitation pattern.

It is generally known that a large array of correlated gyroscopes are capable of performance far exceeding the performance of a single sensor. The fact that the same structure is used to achieve multiple gyroscope outputs is believed to result in a high degree of correlation between the signals and enables advanced signal processing that extracts and compensates for bias drift.

Electronics

Figure 3:
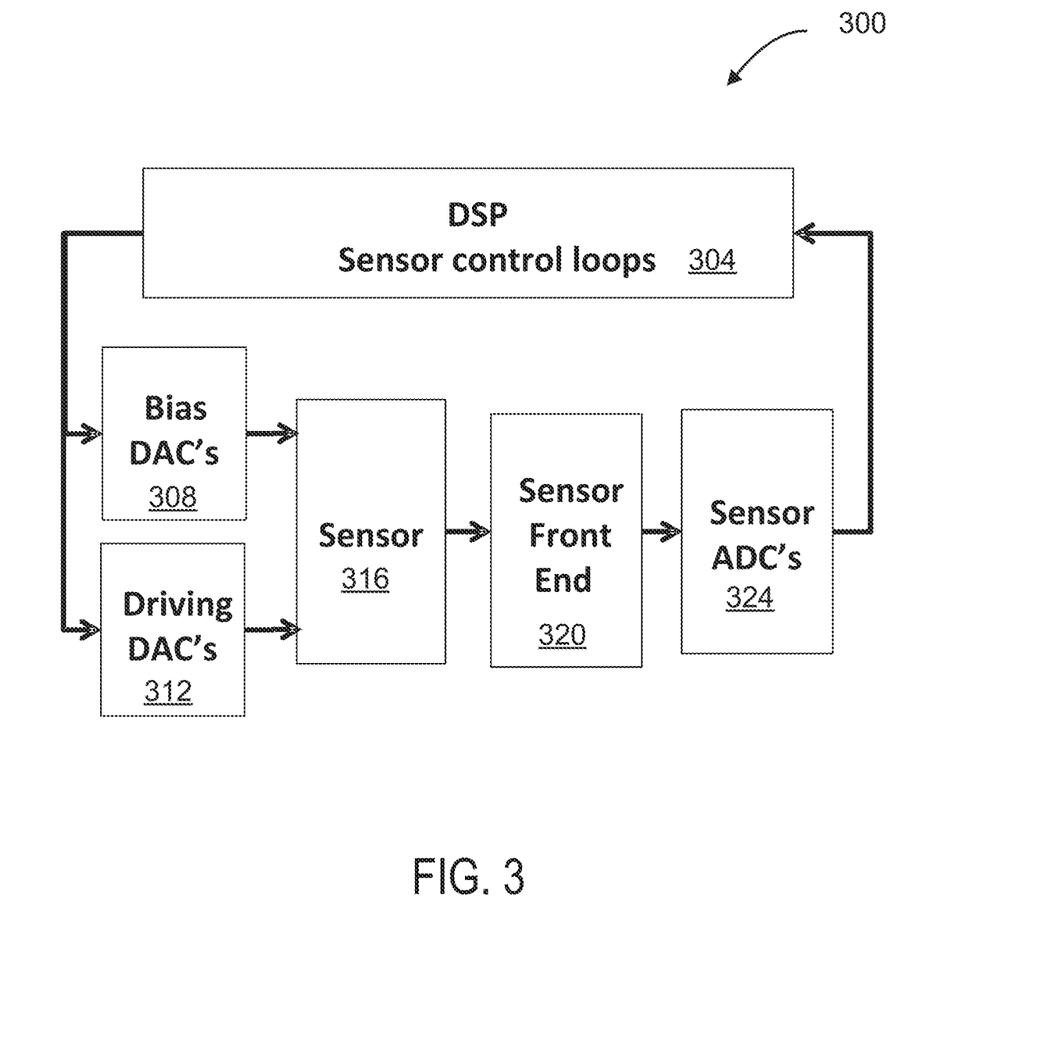
FIG. 3 is a flow diagram of control electronics for the gyroscope sensor in accordance with one embodiment of the invention.

An exemplary control electronics scheme 300 is shown in FIG. 3. As shown in FIG. 3, the control electronics 300 includes digital signal processing (DSP) control loops 304, bias digital to analog converters (DACs) 308 and driving digital to analog converters (DACs) 312, a sensor 316, a sensor front end 320 and sensor analog to digital converters (ADCs) 324. As shown in FIG. 3, the DSP sensor control loop 304 provides input to bias DACs 308 and driving DACs 312, which are connected to the sensor 316. The sensor front end 320 communicates with the sensor ADCs 324, which in turn provide feedback to the DSP sensor control loops 304.

Since the multiple modes are separated in frequency, a single differential pair of excitation, sensing, and tuning hardware can be employed, with the multiple control loops implemented in the Digital Signal Processing (DSP) realm. This greatly simplifies the electronics and allows for efficient miniaturization. The architecture is also scalable, as additional modes (virtual gyros) can be added if necessary via simple changes in firmware with no ASIC hardware or physics package modifications.

The invention has been described in relation to particular examples, which are intended in all respects to be illustrative rather than restrictive. Those skilled in the art will appreciate that many different combinations will be suitable for practicing the present invention. Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A gyroscope comprising:
    a resonator having a sensor area and an array of coupled sensor units arranged in a periodic structure forming a Coriolis-sensitive fabric configured to sense a Coriolis effect associated with movement of the gyroscope and a signal generation unit located at an excitation point within the sensor area and configured to output a first signal and a second signal, the first signal traveling through a first portion of the sensor units along a first travel path from the excitation point to a first measurement location within the sensor area and the second signal traveling through a second portion of the sensor units along a second travel path from the excitation point to a second measurement location within the sensor area; and
    control electronics configured to:
        receive the first signal from the first measurement location,
        receive the second signal from the second measurement location, and
        determine a comparative signal characteristic based on the received first signal and the second signal;
    wherein the first signal propagates along the first travel path in a first direction counter to a second direction in which the second signal propagates along the second travel path.

2. The gyroscope of claim 1, wherein the periodic structure of the sensor units comprises a one-dimensional structure, wherein the sensor units are arranged in at least one coil pattern.

3. The gyroscope of claim 1, wherein the first signal and the second signal output by the signal generation unit travel along the first travel path and the second travel path, respectively.

4. The gyroscope of claim 1, further comprising at least one amplifying gain region including tuning electrodes configured to increase an amplitude of the counter-propagating first signal and the second signal.

5. The gyroscope of claim 1, wherein the first path and the second path include counter-propagating loops coupled to the signal generation unit, and wherein the measurement locations are each coupled to one of the counter-propagating loops.

6. The gyroscope of claim 1, wherein the fabric isolates the resonator from external stress and vibration.

7. The gyroscope of claim 1, wherein the sensor area is 5 millimeters by 5 millimeters, and wherein the array of coupled sensor units is square and comprises 1,000 sensor units×1,000 sensor units.

8. The gyroscope of claim 1, wherein the comparative signal characteristic is a phase delay between the first signal and the second signal at the first measurement location and the second measurement location, respectively.

9. The gyroscope of claim 1, wherein the control electronics are further configured to determine a rotation of the gyroscope based on the determined comparative signal characteristic.

10. The gyroscope of claim 1, wherein the comparative signal characteristic is a time delay between the first signal and the second signal at the first measurement location and the second measurement location, respectively.

11. The gyroscope of claim 1, wherein the first signal and the second signal are each pulses of excitation.

12. The gyroscope of claim 1, wherein the array of coupled sensor units are electromechanically coupled.

13. A gyroscope comprising:
    a resonator body having a sensor area and an array of coupled sensor units arranged in a periodic structure forming a Coriolis-sensitive fabric configured to sense a Coriolis effect associated with movement of the gyroscope and a signal generation unit located at an excitation point within the sensor area and configured to output a first signal and a second signal, the first signal traveling through a first portion of the sensor units along a first travel path from the excitation point to a first measurement location within the sensor area and the second signal traveling through a second portion of the sensor units along a second travel path from the excitation point to a second measurement location within the sensor area;
    control electronics configured to:
        receive the first signal from the first measurement location,
        receive the second signal from the second measurement location,
        determine a comparative signal characteristic between the first signal and the second signal; and
        determine a rotation of the gyroscope based on the determined comparative signal characteristic;
    wherein the first signal propagates along the first travel path in a clockwise direction counter to a counter-clockwise direction in which the second signal propagates along the second travel path.

14. The gyroscope of claim 13, wherein the periodic structure of the sensor units comprises a one-dimensional structure, wherein the sensor units are arranged in at least one coil pattern.

15. The gyroscope of claim 13, wherein the first signal and the second signal output by the signal generation unit travel along the first travel path and the second travel path, respectively.

16. The gyroscope of claim 15, further comprising at least one amplifying gain region including tuning electrodes configured to increase an amplitude of the first signal between the excitation point and the first measurement location.

17. The gyroscope of claim 13, wherein the comparative signal characteristic is a phase delay between the first signal and the second signal at the first measurement location and the second measurement location, respectively.

18. The gyroscope of claim 13, wherein the first signal and the second signal are each pulses of excitation.

19. The gyroscope of claim 13, wherein the array of coupled sensor units are electromechanically coupled.

\* \* \* \* \*